March 17, 1959 E. J. BASGALL 2,877,592
FISHING LURE
Filed April 26, 1955
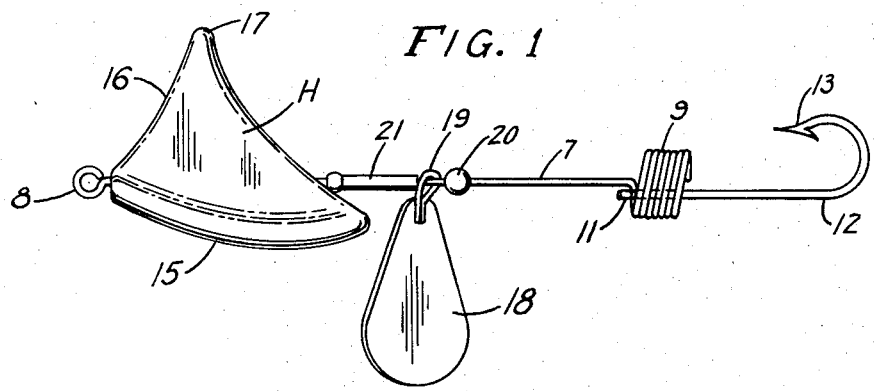
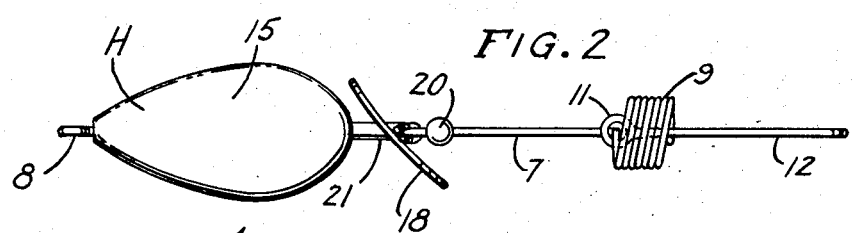
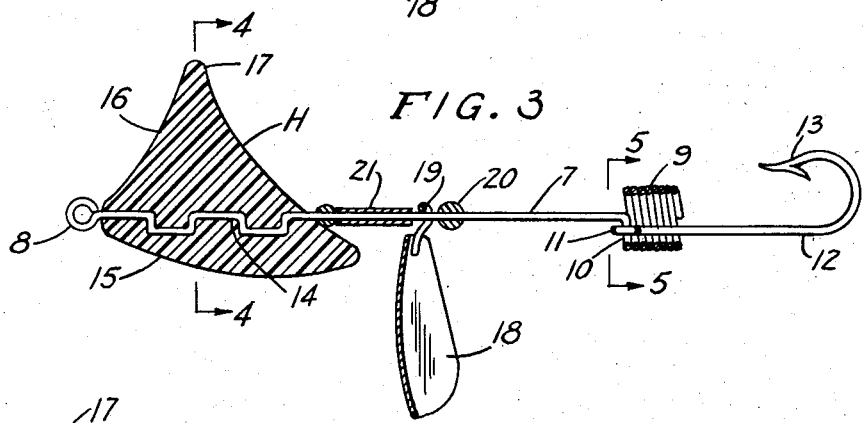
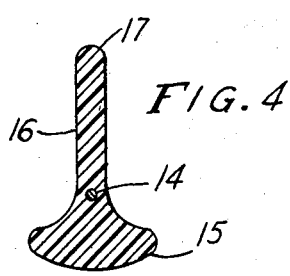
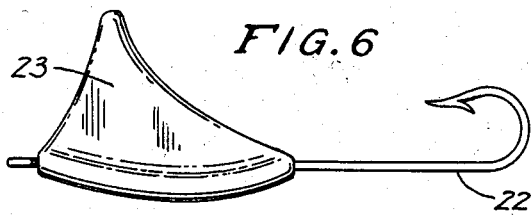
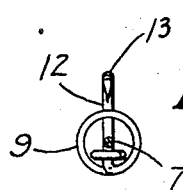
INVENTOR
ELMER J. BASGALL
BY
McMorrow, Berman & Davidson
ATTORNEYS United States Patent Office 2,877,592
Patented Mar. 17, 1959

2,877,592
FISHING LURE
Elmer J. Basgall, Kansas City, Mo.
Application April 26, 1955, Serial No. 503,959
1 Claim. (Cl. 43—42.44)

This invention relates, relates, in general, to a fishing lure.

One object of the invention is to provide means for preventing the fish hook from snagging on logs, brush, rocks, etc.

A further object of the invention is to provide means to prevent the hook from fouling or tangling over the metal shank of the lure.

Further objects, purposes, and characteristic features of the invention will appear as the description progresses, reference being made to the accompanying drawing, showing, solely by way of example, and in no way in a limiting sense, two forms which the invention can assume.

In the drawings:

Figure 1 is a side elevational view of one form of the invention;

Figure 2 is a bottom plan view of the same form;

Figure 3 is a longitudinal sectional view of the same form;

Figure 4 is a sectional view, on line 4—4 of Figure 3, and viewed in the direction of the arrows;

Figure 5 is a sectional view, on line 5—5 of Figure 3, and viewed in the direction of the arrows; and Figure 6 is a side elevational view of a second form of the invention.

Referring now to the drawing, and first to Figures 1–5; the lure includes an elongated wire shank 7, having an eye 8, at its front end, for connection to a fish line. At its rear end the shank is bent to form a tubular circular guard 9, in the form of a helix having several turns. The helix connects to the shank 7 by means of a right angle portion 10, on which is received the eye 11 of a hook 12, with a usual barb end 13. The eye of the hook can be turned around the turns of the guard to position it on the portion 10, with the shank end of the hook extending through the guard, as shown in Figure 3. When so held, the hook 12 can move sidewise and up and down to a limited extent, with respect to the lure shank 7.

At the front end, the shank is bent in angles, as at 14, and passes through a head H. This head, which may be of lead, plastic, or aluminum, etc. is thus held in fixed position on the shank 7. The head has a broad, flat, oval base 15 which is longitudinally curved from end to end and extends below the shank, and a narrow upright top part or fin 16 which has parallel lateral sides and curved fore and aft edges terminating in a rounded point 17, positioned well above shank 7 and hook 12.

It should be noted that the broad base of the head serves to deflect the lure from obstructions on the side while the high top projecting above the shank and hook serves to deflect the lure from obstructions from the top.

Also, with the shank of the hook 12 positioned within the circular guard 9, lateral movement of the hook shank is limited to the width of the base 15 and vertical movement of the hook shank is limited to the distance between the upper edge 17 of the fin and the lower surface of the base 15, thus limiting extreme movement of the hook and the possibility of fouling the hook on the lure shank, as for example, when casting, and the hook is forced to follow in the path of the head of the lure.

A usual spinner blade 18 is carried on the shank 7 by an eye 19, between stop members 20 and 21.

In the form of the invention shown in Figure 6, a hook 22 has its shank end held in fixed position in a head 23, which head is of the same shape as the head H, described above, and bears the same relationship to the hook 22 as does head H to its shank 7 and hook 12. Thus the head 23 is effective to prevent snagging of the hook 22 in the same manner as above described.

While the exact proportions of the parts of the lure are not essential to the invention, one lure which has proven very effective in practice has the following specifications for the head:

Bottom part extends 1/4" below shank or hook.
Bottom part 9/16" at its widest part.
Bottom part 1" long, from front to rear.
Top to extend 9/16" above shank or hook.
Top to be 3/32" thick.
Shank to be 2" long, and hook 3/4" long.

As will be noted from Figure 4, the head when viewed in cross section has the shape of an inverted T, with the base providing the cross bar of the T and the fin or top part 16 of Figure 4 or 23 of Figure 6 constituting the leg of said inverted T. The fin is of flattened formation, and as will be noted, the curved outer end portion of the hook, that terminates in the barb of the hook, lies in the plane of the fin. The greatest portion of the shank connected to the head extends within the fin. For example, in the form of Figure 1 the portion of the shank that extends within the head is confined wholly within the fin adjacent base 15 except for the shank portion immediately in back of eye 8, which passes through the forward extremity of the base. In this form, the base is slightly curved longitudinally over its full length, with the underside of the base, at the leading end of the base, diverging from the shank in a direction rearwardly from the eye 8 of the device. This creates a water current leading away from the shank, in which current there will be entrained any weeds or other obstructions on which the hook might snag. The same is true of the form of Figure 6. In this form the shank passes through the opposite extremities of the longitudinally curved base, but for the remaining part of the shank portion that extends through the head, said shank extends within the fin or top part 23 of the head. In this form of the invention, again, the longitudinal curvature of the shank is such that the leading end portion of the underside of the base diverges from the shank in a direction rearwardly from the eye of the lure.

The above specific description of two forms of this invention has been given solely by way of example and is not intended in any manner whatsoever in a limiting sense.

Furthermore, all such modifications, variations, and adaptations as fall within the scope of the appended claim are intended to be protected by this disclosure.

What is claimed is:

A fish lure comprising: a head including an upright fin having lateral sides which are parallel and having fore and aft edges which are curved and a base integral with and formed to a width substantially greater than the thickness of the fin, said base being longitudinally curved from end to end thereof to form a convex surface thereon, the convex surface facing downwardly and the plane of the fin longitudinally bisecting said surface; an elongated shank lying wholly in said plane and having a forward end portion embedded in the head, said forward end portion terminating at its forward extremity in a line-attaching eye at the front end of the base, the shank projecting rearwardly from the base; a guard comprising a series of helically turned, closed convolutions integral at one end with the rear end of the shank, said rear end of the shank including a right angular extension merging into said series of convolutions; and a fishhook including an eye loosely receiving said extension for pivotally connecting the hook to the shank, a hook shank extending through the guard, and a barb end on the hook shank, the guard limiting lateral swinging movement of the hook shank beyond positions in which the barb end of the hook is substantially aligned longitudinally of the lure with the respectively opposite side edges of the base, said guard limiting the hook against up-and-down swinging movement beyond positions in which the barb end of the hook is aligned longitudinally of the lure with the upper end of the fin and the bottom of the base, respectively.

References Cited in the file of this patent

UNITED STATES PATENTS

| | | |
|---|---|---|
| 779,083 | Jamison | Jan. 3, 1905 |
| 1,701,444 | Darr | Feb. 5, 1929 |
| 1,768,033 | Deatz | June 30, 1930 |
| 2,085,096 | Hansen | June 29, 1937 |
| 2,131,858 | Ledrich | Oct. 4, 1938 |
| 2,527,468 | Turner | Oct. 24, 1940 |
| 2,674,823 | Gellings | Apr. 13, 1954 |

FOREIGN PATENTS

| | | |
|---|---|---|
| 659,706 | Great Britain | 1951 |
| 1,015,165 | France | 1952 |
| 1,101,160 | France | Apr. 20, 1955 |